March 22, 1955  N. P. MILLAR ET AL  2,704,827
MAGNETIC FIELD RATIO INSTRUMENT
Filed July 22, 1950  3 Sheets-Sheet 1
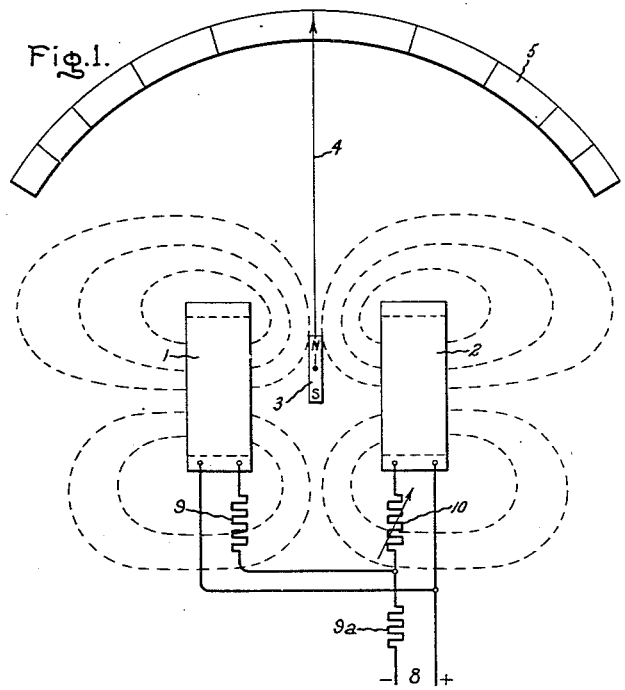
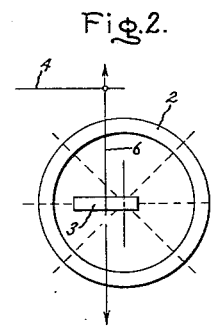
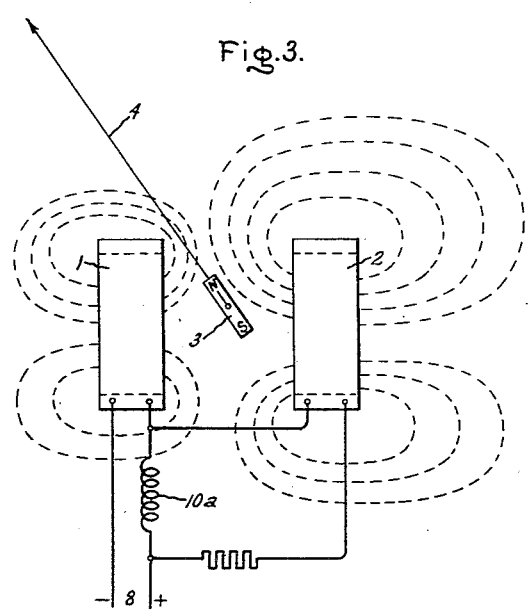
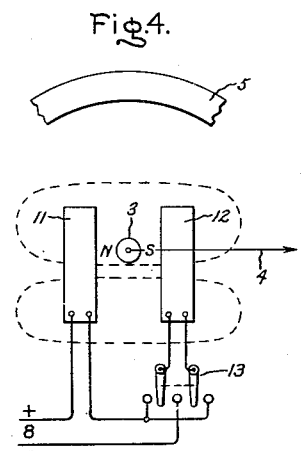
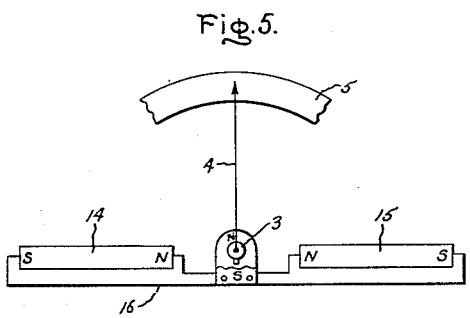
Inventors:
Norval P. Millar,
Stephen C. Hoare,
by Russell A. Warner
Their Attorney.

Inventors:
Norval P. Millar,
Stephen C. Hoare,
by Russell A. Warner
Their Attorney.

March 22, 1955  N. P. MILLAR ET AL  2,704,827
MAGNETIC FIELD RATIO INSTRUMENT
Filed July 22, 1950  3 Sheets-Sheet 3

Inventors:
Norval P. Millar,
Stephen C. Hoare,
by Russell A. Warner
Their Attorney.

United States Patent Office 2,704,827
Patented Mar. 22, 1955

2,704,827

MAGNETIC FIELD RATIO INSTRUMENT

Norval P. Millar, Danvers, and Stephen C. Hoare, Manchester, Mass., assignors to General Electric Company, a corporation of New York Application July 22, 1950, Serial No. 175,382

5 Claims. (Cl. 324—147)

Our invention relates to a magnetic field ratio instrument wherein the relative strengths of two magnetic fields are compared, and its object is to provide a low-cost, high-torque measuring instrument of wide application, since the fields may be produced by a wide variety of means and for a wide variety of purposes.

Figure 6:
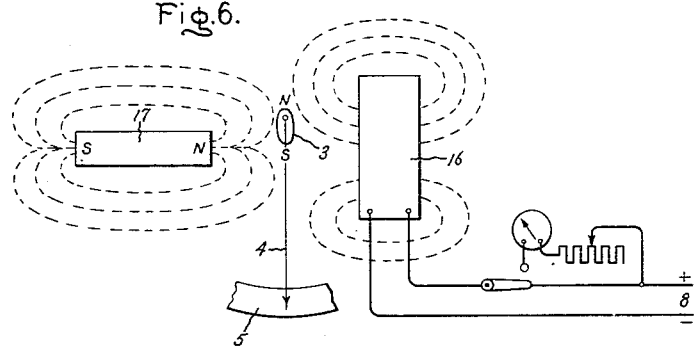
Figure 7:
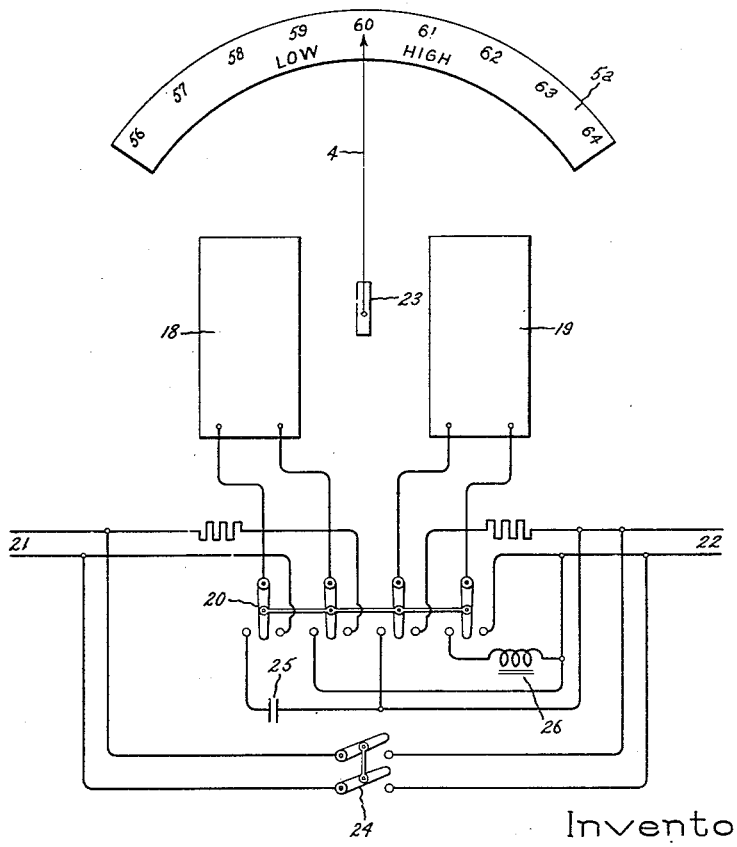
Figure 8:
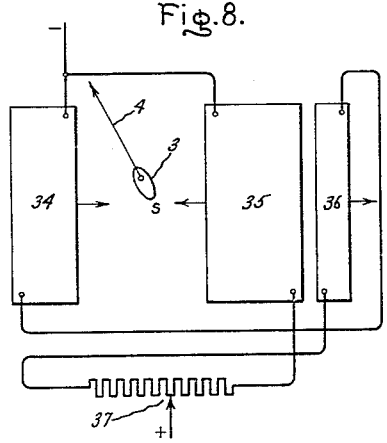
Figure 9:
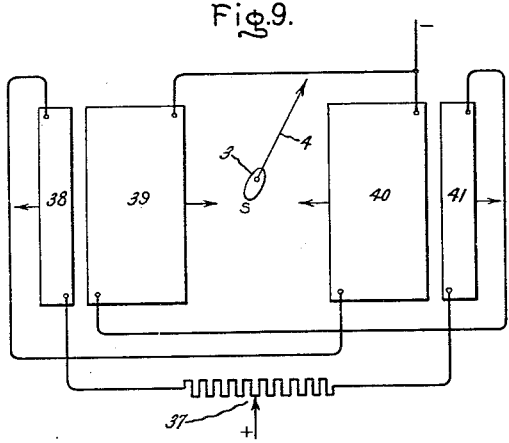
Figure 10:
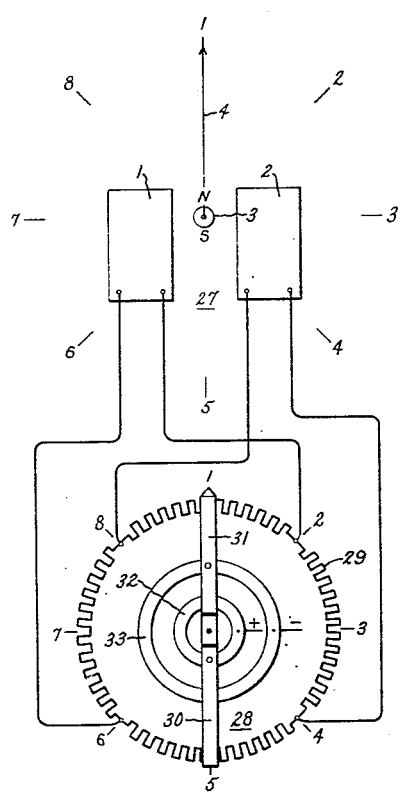
Figure 11:
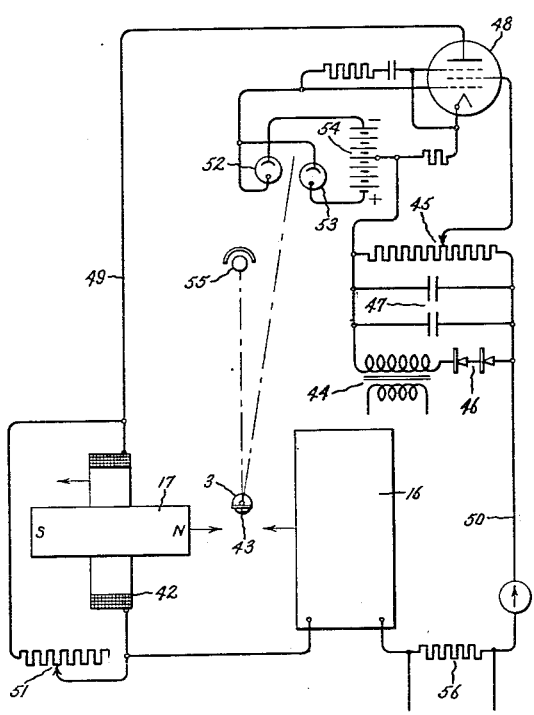

The features of our invention which are believed to be novel and patentable will be pointed out in the claims appended hereto. For a better understanding of our invention reference is made in the following description to the accompanying drawing in which Fig. 1 represents a temperature measuring instrument embodying our invention, where the two magnetic fields are produced by current coils contained in parallel circuits, one circuit containing a temperature sensitive impedance. Fig. 2 represents a partial axial view of Fig. 1 as seen from the left end thereof. Fig. 3 shows an instrument like that of Fig. 1 but with a different field distribution and connected for the measurement of the temperature of a winding by means of the resistance method. Fig. 4 represents the invention used for determining the polarity and number of turns in coils by comparison to a standard coil. Fig. 5 represents the invention as used for grading permanent magnets according to magnetic field strength. Fig. 6 represents an embodiment of the invention for measuring current or voltage where the measured field is compared to a standard field produced by a permanent magnet. Fig. 7 represents an embodiment of our invention used as a frequency meter and synchroscope. Figs. 8 and 9 represent embodiments of our invention for increasing the ratio sensitivity. Fig. 10 represents our instrument as used for a receiver of a position indicating system. Fig. 11 represents our invention used as a constant current regulator.

Referring now to Fig. 1, the instrument here shown comprises two preferably similar stationary air core coils 1 and 2, spaced apart in approximately axial alignment, and connected to produce opposing fields in the space between the coils. The coils are spaced sufficiently close together that this opposing field flux is distorted by crowding. Located in this space midway between the coils and to one side of their axial center line is a magnetic armature or vane 3. This armature is pivoted on an axis at right angles to the axes of the coils and at right angles to the direction of the prevailing field at its location (see Fig. 2), and is elongated or polarized, and is sufficiently small in comparison to the field pattern that it will align itself with the prevailing field in a small area where the opposing flux lines are crowded and have a high curvature. It will be noted that the armature 3 comprises the only magnetic material or other flux diverting means influencing the distribution or direction of the fluxes in the return flux paths externally of the two field producing means. Where the coils are to be energized by direct current, the magnetic armature is preferably a permanent magnet as this increases its sensitivity and torque for a given size. A pointer 4 is secured to the armature shaft 6 and indicates on a stationary scale 5.

The coils are energized in parallel from a direct current source 8, coil 1 being energized through a resistance 9 having a zero or negligible temperature coefficient of resistance and the coil 2 through a resistance 10 which varies with the quantity to be measured, and in the case of temperature measurement will have a temperature coefficient of resistance as here assumed.

The apparatus preferably is designed or adjusted such that when the quantity to be measured has a midrange value, the fields produced by the two coils 1 and 2 are equal, opposed, and of such a value as to give good torque action on the polarized armature 3. With the armature located as previously described, it will therefore line up with the resultant vertical field at such location and assume the vertical position indicated in Fig. 1, and the pointer 4 will indicate on the central portion of scale 5 as represented when the opposing fields are equal. In case the polarity of the resultant flux in relation to the polarity of the armature is such as to cause the pointer 4 to point down instead of up, the source of supply connections may be reversed or the pointer rotated 180 degrees with respect to the armature. The dotted line flux pattern shown in Fig. 1 is merely representative and not necessarily complete.

Now, when the temperature influencing resistance 10 decreases, the current in coil 2 will increase in relation to that in coil 1 and there will be a change in the flux distribution and resultant flux direction in the area occupied by armature 3 of the general character represented in Fig. 3, turning the armature downscale as represented. Likewise, when the temperature increases above the value assumed in Fig. 1, there will be less current flowing in coil 2 as compared to coil 1, and the flux pattern will shift to the right and its direction in the vicinity of the armature will change (rotate to the right) and rotate the armature accordingly in the up-scale direction. Best results are obtained by keeping the armature small and locating it where there is the greatest change in flux direction with relative variations of flux produced by the two coils. It will be evident that the armature must be located offcenter with respect to an axial center line between the coils. The scale 5 may now be calibrated in temperature units or other quantity being measured. The torque of this type of instrument is high and sufficient to operate a recording stylus. The operation is stable and sensitive to small changes in the measured quantity, and the accuracy is independent of variations in voltage of the source of supply.

The sensitivity of the operation of the instrument of Fig. 1 may be increased by including a resistance $9a$ in the supply lead to resistances 9 and 10 because then when the temperature decreases and the resistance 10 decreases and increases the current through coil 2, the drop across resistance $9a$ will increase and therefore decrease the current in coil 1, thus producing a differential action. The use of the resistance $9a$ is optional.

It will be evident that the presence of the magnetic armature 3 positioned to one side of an axial center line between the coils tends to divert the fluxes of the opposed fields towards the armature, thereby increasing flux concentration in and about the armature over that which would exist at the armature position if the armature were removed. This is advantageous as it increases the utilization of the available flux for measurement purposes.

The scale length and distribution for a given ratio range will be influenced by the location of the armature between the coils, and the size, shape, and manner of pivoting of the armature. A scale length of 137 degrees and scale distribution represented in Fig. 1 are obtained by an instrument having the following specifications: Coils 1 and 2 each of 100 turns, ⅝ inch outside diameter and ¼ inch axial length, and spaced apart in axial alignment ½ inch. Use a polarized ¼ inch length bar armature 3 pivoted at its center midway between the coils and with its axis of rotation ¹⁄₁₆ inch from a center line between the coils and at right angles to the resultant field at such location. With 30 milliamperes constant current in coil 2 and varying the current in coil 1 from 20 to 40 milliamperes, the scale calibration of Fig. 1 results where the graduations represent milliamperes in coil 1. If the armature is a permanent magnet it may vary in shape from a cylinder to a bar shape. If not a permanent magnet, it will necessarily have to be elongated so as to have a preferred and controlling flux axis. A short cylindrical permanent magnet such as shown in Figs. 4 and 5 is very satisfactory as it has high torque, good responsiveness, and is small in size. The scale distribution can be controlled to some extent by the shape and manner of pivoting of the armature. Thus a cylindrical permanent magnet may be pivoted at its center or offcenter. An elliptical or bar polarized or nonpolarized armature may be pivoted at its center or even at one end. The effect of pivoting an armature offcenter is to shift its mass sideways in the field as it turns. Thus, in Fig. 6, if the armature be pivoted near its top, it will shift to the right somewhat when turned counterclockwise. For alternating current use the armature will be nonpolarized and elongated, but may vary in shape and in its manner of pivoting. The scale distribution can also be modified by slight changes in the spacing and alignment of the two field producing means. Once the instrument has been calibrated, the features which influence scale distribution should not be changed or, if changed, the instrument should be recalibrated.

In Fig. 3 the connections are shown for measuring the temperature of a field coil 10a by the resistance drop method, where coil 1 carries the current of field coil 10a, and coil 2 carries a current proportional to the voltage drop across such field coil. A rise in temperature and resistance of coil 10a will reduce the current in coil 1 and increase it in coil 2, and the instrument may be calibrated either in the resistance or temperature of coil 10a. In such an application it will generally be desirable to wind coil 1 with a relatively small number of turns and with heavier wire as compared to coil 2, with the ampere turns about equal in the two coils at the middle of the measurement range.

In Fig. 4 use is shown of the invention for testing the polarity and number of turns in coils. In Fig. 4, 11 represents a standard coil of known polarity and number of turns, and 12 represents another coil supposed to be similar to coil 11 but which is to be checked for polarity and number of turns. The two coils are connected in series through a reversing switch 13 to a D.-C. source of supply 8, and a polarized armature 3, pointer 4, and scale 5 are provided as in Fig. 1. When the switch 13 is closed to the right, the fields of the two coils will oppose each other if the two coils are wound in the same direction in relation to their terminals, in which case the pointer 4 and armature 3 will assume a generally vertical position with the pointer pointing upwardly or downwardly. If the coils are not similarly wound relative to their terminals, the resultant field will be generally horizontal as represented in Fig. 4, and the pointer 4 will assume a horizontal position pointing to the right (as shown) or to the left.

Assuming that the polarity of the supply 8 is known and the polarity of the armature 3 in relation to the pointer 4 is known, the terminals of the two coils may now be correctly marked with + and —, or other suitable signs, so that whenever subsequently connected to a source of supply of known polarity, the polarity of the field which these coils will produce will be definitely known prior to the connection. Thus the polarity of the coils with respect to a known polarity source of supply and with each other is definitely ascertained. To test for turn number, connections are changed as may be necessary to cause the pointer 4 to indicate on scale 5. If the number of turns in the two coils are the same, the pointer 4 will be at midscale, since the current in the two coils is the same due to the series connection. If the number of turns are unequal, the pointer 4 will deflect to the left of center for more turns in coil 12 than in coil 11, and to the right for less turns in coil 12 than in coil 11. The scale 5 may be calibrated in terms of the ± percentage difference of turns in coil 12 as compared to coil 11 and this quantity measured with good accuracy.

In Fig. 5, we have shown the use of the invention for checking the strength of or calibrating permanent magnets. Here one of the magnets, for example, 14 may be a standard permanent magnet of known stabilized strength, and the magnet 15 another permanent magnet of the same dimensions to be compared to magnet 14 either for calibration purposes, or for adjusting the strength of magnet 15 so as to be equal to that of magnet 14. A nonmagnetic support 16 is provided so as correctly to position the magnets with respect to the pivoted armature 3. The magnets are assembled with like poles opposed and such that the polarized armature 3 will cause the pointer 4 to indicate on scale 5. When the two magnets are of equal strength, the armature 3 and pointer 4 will be in a midscale position. If magnet 15 be the stronger, pointer 4 will deflect to the left from center a distance proportional to the difference in field strengths produced by the two magnets etc., and since magnet 14 is a standard of known strength, the scale may be calibrated in suitable units or percentage. Magnet 15 may then be removed and given a knockdown and retested or exchanged for the next magnet to be tested.

In Fig. 6, we have shown an arrangement for measuring current or voltage or the strength of permanent magnets. The current or voltage to be measured is connected to energize coil 16. A standard permanent magnet 17 is positioned to have its field oppose that of coil 16 and to be equal to that of coil 16 at or near the center of the range of measurement. The arrangement is such that the polarized pivoted armature 3 lies in the region of resultant flux where it is concentrated and has a high degree of curvature and direction change with variations in the field produced by coil 16. The most sensitive position for armature 3 will not necessarily be exactly midway between the adjacent ends of coil and magnet, nor will the magnet 17 necessarily be exactly centered and in line with the axis of coil 16. The best relative position of the parts may be determined experimentally. Likewise, the final selection of the most suitable size, shape, and strength of permanent magnet 17 for the range of flux field of coil 16 to be measured, and the length and distribution of scale desired may be finally determined by experiment. However, almost any reasonable combination will give reliable measurement results after the parts are fixed in place and the combination calibrated. The scheme of Fig. 6 may be used to indicate the charge and discharge of a storage battery using a length of scale of about 120 degrees. By connecting an ammeter and adjustable resistance in series with coil 16, the strength of permanent magnets placed at 17 may be measured.

A two-coil measurement scheme like Fig. 1 may be used with an alternating current source of supply if the armature used at 3 be nonpolarized and of elongated shape. Such an alternating current measuring arrangement is shown in Fig. 7 for the measurement of frequency and as a synchroscope. In Fig. 7 the coils 18 and 19 are connected to the blade terminals of a four-pole double-throw switch 20. When this switch is thrown to the right, the instrument is connected to operate as a synchroscope between two alternating current lines 21 and 22. The connections are such that when the two lines are inphase, the coils 18 and 19 will produce opposed fluxes in the area of the elongated soft iron armature 23 simultaneously, and if the voltages of lines 21 and 22 are equal, the fluxes will be equal and the pointer 4 will indicate on the center of a scale 5a. If the A.-C. voltages are not of the same frequency, the pointer 4 will oscillate, the rate of oscillation becoming slower and the amplitude thereof more pronounced as the A.-C. voltages approach the same frequency.

When the frequencies are the same, the pointer 4 will have a horizontal position for a 180-degree out-of-phase condition and will read steadily somewhere on scale 5a for an inphase condition. If the voltages are inphase and of equal magnitude, the pointer will be steady at the center of scale 5a. If the voltage of line 18 is high as compared to that of line 19, pointer 4 will indicate to the right of the center of the scale a distance proportional to the unbalance in the voltages and if the voltage of line 18 is low as compared to line 19, pointer 4 will indicate to the left of the center scale a distance proportional to the voltage unbalance. If we consider line 21 as the incoming line which is adjusted in order to synchronize, we may mark the scale "High" and "Low" to the right and left of center as indicated, the indications referring to the voltage of line 21. Thus, to synchronize, the frequency and voltage of line 21 are adjusted until the pointer gives a steady indication at the center of scale 5a, after which the lines may be connected as by a line switch 24. From the explanation given, it will be evident that the device of Fig. 7 may also be used as a beat frequency meter.

By another connection the instrument may also be used as a frequency meter. This is shown by the connection which is made when the switch 20 is thrown to the left, either before or after switch 24 has been closed. As thus connected, coil 18 is connected through a condenser 25 to line 22, and coil 19 is connected through a reactance 26 to line 22. Hence, the current in coil 18 will increase with an increase in frequency, while the current of coil 19 will decrease with an increase in frequency and vice versa. Moreover, the currents in coils 18 and 19 will be approximately 180 degrees out of phase as compared to corresponding connections, but without the phase shifting devices 25 and 26. Hence, to get the alternating fluxes of the two coils most nearly in bucking relation in the armature area, the coils should be connected to the line in a like polarity relation. And it is seen that coil 18 has been reversed relative to coil 19 as compared to the connections when switch 20 was in the right-hand position. The constants of the circuits are so chosen that at normal frequency, assume to be 60 cycles, the fluxes produced by coils 18 and 19 are equal. The armature will therefore cause the pointer 4 to indicate midscale. For higher frequencies the flux of coil 18 will prevail, and for lower frequencies the flux of coil 19 will prevail, and the pointer will indicate to the right and left of center accordingly by an amount proportional to the departure from 60 cycles. The scale 5a may therefore be graduated accordingly as shown. Except for the fact that the resultant flux acting on the armature is alternating, the action is essentially the same as for a direct current polarized armature instrument. The armature turns into the line of the resultant flux and turns with the change in the direction of the line of the resultant flux, due to changes in the relative strengths of the two alternating fields. The inertia of the armature assembly prevents any noticeable vibration that may be due to some out-of-phase relation in the bucking fluxes at normal frequency, and it responds to the average difference between such fluxes. Due to the fact that the armature is nonpolarized and is acted upon intermittently, the A.-C. type of instrument will not have as much torque as the direct current polarized armature type, but it will be amply sufficient for indicating purposes, and the arrangement of Fig. 7 makes a practicable synchroscope or frequency meter, or both. It will also be obvious that this same instrument may be used for direct current measurement applications, such as exemplified in Figs. 1 and 3.

The temperature measuring scheme of Fig. 1 could be energized by alternating current without any change in the coil connections because there is no phase shifting between the parallel circuits. However, we would use a nonpolarized armature in such an alternating current energized temperature measuring system. Also, the scheme of Fig. 1 could be used as is with an alternating current supply by including a rectifier in the supply circuit to terminals 8.

In Fig. 10, we have shown the use of our instrument as a receiver for a position indicating telemetering system. The receiver 27 is an instrument essentially like that shown in Fig. 1 but equipped with a 360-degree scale. The transmitter 28 comprises a continuous ring resistance element 29 on which ride diametrically opposite brush arms 30 and 31 connected through brushes and slip rings 32 and 33 to the + and − sides of a direct current source of supply. Diametrically opposite points of the resistance ring 29 at scale points 2 and 6 are connected to coil winding 1 of the receiver, and diametrically opposite points of the resistance ring at scale points at 4 and 8 are connected to coil 2 of the receiver. The resistance connections to coils 1 and 2 are thus displaced from each other by 90 degrees about the resistance ring.

In the position of the parts shown, coils 1 and 2 will be connected so that their fluxes in the vicinity of armature 3 oppose each other, and for the midposition of the transmitter brush arm the opposed fluxes in the receiver will be equal. Thus, the pointer 4 takes the scale position 1 as represented. If the upper or pointer end 31 of the brush arm be turned to transmitter position 2, coil 1 of the receiver will be more strongly energized and coil 2 will be deenergized. Consequently, the pointer 4 will take approximately the position 2. Turning the transmitter brush arm to position 3 will equally energize coils 1 and 2, but the current of coil 2 will have been reversed and pointer 4 will take receiver position 3. With the transmitter brush arm in position 4, coil 2 of the receiver carries maximum current, and coil 1 will be deenergized, and pointer 4 will take an approximate position 4. Moving the pointer end 31 of the transmitter brush arm to position 5 will decrease the current in coil 2 and raise the current in coil 1, but the latter is now in a reversed direction. Now both fields have been reversed and are equal so that the armature 3 is reversed from the position shown in the drawing and is at receiver position 5. The operation for the remaining numbered positions of transmitter and receiver follows the same reasoning and need not be further explained. Some variation from a uniform resistance ring 29 and some experimental shifting of the position of armature vane 3 may be required to obtain the most uniform receiver position scale distribution with respect to points 2, 4, 6 and 8. However, this is not essential since the scale of the receiver may be exactly calibrated with the position of the transmitter even though the receiver scale be not exactly uniform.

In Fig. 8, we have represented a coil arrangement for our instrument for increasing the ratio sensitivity. Three field producing coils 34, 35 and 36 are used. The armature 3 is placed between coils 34 and 35 as and for the purpose previously described. Coils 34 and 36 are connected in series and produce fluxes in the same axial direction indicated by arrows. Coil 35 produces a flux in the opposite axial direction which opposes the fluxes of coils 34 and 36. Means subject to some measurement and represented by the variable resistance at 37 is used to vary the relative values of current flowing in the two branches, one branch containing coils 34 and 36 in series and the other branch containing coil 35. Coils 35 and 36 will be wound on the same form as a single winding. This two-coil winding will produce a resultant flux in the armature space which is proportional to the difference between the coil ampere turns. Assume, now, that coil 34 has 100 turns, coil 35 has 150 turns, and coil 36 has 50 turns. When the currents in the two branches are equal, the opposed fluxes acting upon the armature 3 will be equal. Assume, now, that the current relation in coils 34 and 36 is five, and that in coil 35 is ten. Then the ampere turn relation for the three coils will be: Coil 34=5×100=500; coil 36=5×50=250; coil 35=150×10=1500. The opposed fluxes acting on armature 3 will be proportional to 500, and 1500−250=1250, or the ratio measurement sensitivity of the instrument has been increased over Fig. 1 in the relation of 2 to 2.5.

In Fig. 9, we have represented a four-coil ratio instrument having coils 38, 39, 40 and 41 of 50, 150, 150 and 50 turns, respectively, with coils 38 and 40 connected in one series branch circuit to produce fluxes in one direction, and with coils 39 and 41 connected in the other series branch circuit to produce fluxes in the opposite direction. With equal currents in each branch circuit, the opposed fluxes acting upon the armature 3 will be balanced. Assume now that the current relation in the two branches is changed to five for coils 38 and 40, and ten for coils 39 and 41. Then the ampere turn relation for the four coils will be: Coil 38=50×5=250; coil 40=150×5=750; coil 39=150×10=1500; and coil 41=50×10=500. The opposed fluxes acting upon armature 3 will be proportional to 1500−250=1250 for coils 38 and 39, and 750−500=250 for coils 40 and 41, or the measurement ratio sensitivity of the instrument will be five times greater as compared to Fig. 1. This means that if in Fig. 1, we change the current ratio from 1 to 2, we obtain a change in flux ratio acting upon the armature of 1 to 2, whereas in Fig. 9, if we change the current ratio from 1 to 2, we obtain a change in flux ratio acting upon the armature of 1 to 5. In this way the instrument may be made highly sensitive to small changes in current ratio in the two opposing fields.

In Fig. 11, we have shown our invention used as a constant current regulator and from which a standard current or voltage may be obtained. Here the main opposing field producing means consists of a well stabilized permanent magnet 17 and an air core coil 16 as in Fig. 6. An auxiliary coil 42 surrounds the permanent magnet 17 and to the extent that the coil 42 may be energized, it produces a field which opposes that of the permanent magnet. Such field as may be produced by coil 42, however, is relatively small and less than that which will produce any demagnetizing of the permanent magnet. The directions of the fields produced by 16, 17, and 42 may be represented by the arrows extending therefrom. The polarized pivoted armature 3 moves a mirror 43 instead of a pointer, and through a photocell optical system controls the amount of current flow in coils 16 and 42. An alternating current supply 44 is used and rectified to obtain a direct current voltage across a resistance 45 by means of a rectifier 46 and smoothing condensers 47. Direct current from across resistance 45 is fed to coils 42 and 16 in series relation through a regulating tube 48 and current connections 49 and 50. The proportion of the circuit current which flows in coil 42 may be varied from zero to a maximum by means of an adjustable resistance 51 connected in shunt to coil 42.

The volume of current which tube 48 passes is controlled by controlling its control grid bias by means of two light sensitive cells 52 and 53 connected across a battery 54. The midpoint of the battery is connected to the cathode of tube 48, and the control grid of the tube is connected between the cells 52 and 53. Thus the grid bias of tube 48 varies with the relative amount of light falling upon cells 52 and 53. When more light falls on cell 53, its resistance is decreased and the grid bias of tube 48 is increased and it conducts more current. The opposite occurs when more light falls on cell 52. The light falling on cells 52 and 53 is reflected from the mirror 43 from a light source 55.

Assume, first, that coil 42 is short circuited by decreasing the shunt resistance 51 to zero. The apparatus is now adjusted so that when the opposing fields of magnet 17 and coil 16 position armature 3 so that light falls equally on cells 52 and 53, the current flowing in the circuit of tube 48, connections 49, 50, and coil 16 is of the desired value. The apparatus described will now hold this current at substantially the same correct value regardless of expected variations in the supply voltage at 44, or a reasonable amount of load taken from the constant current circuit. If a standard of voltage is desired, a constant resistance 56 may be included in the circuit and across which a constant voltage will exist. If the current in the circuit tends to decrease, the armature 3 will turn slightly to decrease light on cell 52 and increase it on cell 53, causing the tube to pass an increased amount of current. The reverse regulation will occur if the current in the circuit and coil 16 tends to increase above the desired value.

It is evident that the permanent magnet 17 becomes a standard of reference to which the current flowing is compared through the opposing field produced by coil 16 by such current. While this will provide a rather sensitive control, the sensitivity may be increased as well as varied by allowing more or less of the current to flow through coil 42. Assume now that we allow a limited amount of the current to flow through coil 42 by including some of the resistance at 51 in shunt to coil 42. The field of coil 42 opposes the field of magnet 17. The armature 3 will take a new position and the control apparatus will need a new adjustment as, for example, moving light source 55 more to the left until the current flowing through the resistance 56 is at the desired value. The control is now more sensitive because an increase or decrease in current from the desired value not only increases and decreases the field of coil 16, but also decreases and increases the resultant opposing field produced by the opposing fluxes of coil 42 and magnet 17. The change in resultant flux direction in the crowded flux area occupied by armature 3 is now more sensitive to a change in current because of the differential control of the field by coils 16 and 42. The permanent magnet 17, however, is still a standard of reference and determines and fixes the value of the current that will result in a balanced control condition.

It is evident that the galvanometer of Fig. 6 may be provided with the differential auxiliary coil 42 of Fig. 11 to increase the sensitivity of the galvanometer action.

It will be evident from the foregoing examples that we have provided a simple, rugged, low-cost, sensitive, high-torque instrument of wide application.

In accordance with the provisions of the patent statutes we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent of the United States is:

1. An instrument for comparing the relative strengths of two magnetic fields, comprising a pair of stationary magnetic field producing means, said means being spaced apart and substantially parallel to each other with their flux axes in substantial alignment and with their fluxes in opposition so as to create an area between them where the resulting opposing flux lines are crowded and turned away from each other, an elongated magnetic vane armature located in said crowded flux area, said area being otherwise free of magnetic material, said armature being pivoted for free rotation substantially midway between the pair of field producing means, on an axis to one side of and substantially perpendicular to a center line joining the flux axes of said pair of field producing means, and which axis is at substantially right angles to the direction of the resultant flux at the point where the armature is located, and means operated by the rotation of said armature in response to changes in the relative values of the opposing fluxes.

2. An instrument for comparing the relative strengths of two magnetic fields, comprising in combination a pair of stationary magnetic field producing means spaced apart relative to each other so that their flux axes are approximately in alignment and their fluxes are opposed, and a magnetic vane armature located approximately midway between said pair of field producing means, and to one side of a center line connecting said pair of field producing means, said armature being of a type which has a preferred flux axis capable of aligning such axis with the direction of the prevailing field in which located and comprising the only magnetic material or other flux diverting means influencing the distribution or direction of the fluxes in the return flux paths externally of said pair of field producing means, said armature having a pivoting axis which is at approximately right angles to the direction of the resultant field produced by said pair of field producing means where the armature is located such that its preferred flux axis will align itself with such resultant field, said pivoting axis being located to one side of said center line connecting said pair of fields, said pair of fields producing means being located sufficiently close together that over the range of fluxes to be compared, the armature is located in a region of strong resultant flux concentration the direction of which shifts with changes in the relative strengths of the fields produced by said two means.

3. An instrument as claimed in claim 2, in which the two opposed field producing means comprise air core windings, at least one of said windings being made up of two coils which produce opposed fluxes one of which coils is connected in series relation with winding turns of the other field producing means.

4. An instrument as claimed in claim 2, in which the two opposed field producing means are air core windings, each winding containing two coils of unequal numbers of turns and producing opposing fluxes, the coil of larger number of turns in each such winding being connected in series with the coil of the smaller number of turns in the other winding.

5. An instrument as claimed in claim 2, in which the two field producing means are air core windings, and the magnetic vane armature is elongated and of nonpermanent magnetic material whereby such instrument may be operatively energized by alternating currents.

References Cited in the file of this patent

UNITED STATES PATENTS

| | | |
|---|---|---|
| 1,161,819 | Grob | Nov. 23, 1915 |
| 2,178,108 | Schwarze | Oct. 31, 1939 |
| 2,181,960 | Bacon | Dec. 5, 1939 |
| 2,294,741 | Fisk et al. | Sept. 1, 1942 |
| 2,446,579 | Fritzinger | Aug. 10, 1948 |
| 2,460,686 | Fritzinger | Feb. 1, 1949 |
| 2,485,577 | Dubin et al. | Oct. 25, 1949 |